United States Patent
Kojima et al.

(10) Patent No.: US 8,078,921 B2
(45) Date of Patent: Dec. 13, 2011

(54) SYSTEM INCLUDING A PLURALITY OF DATA STORAGE DEVICES CONNECTED VIA NETWORK AND DATA STORAGE DEVICE USED THEREFOR

(75) Inventors: Akira Kojima, Kanagawa (JP);
Hiromoto Takeda, Kanagawa (JP);
Hiroyuki Takada, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1090 days.

(21) Appl. No.: 11/906,612

(22) Filed: Oct. 2, 2007

(65) Prior Publication Data

US 2008/0104444 A1    May 1, 2008

(30) Foreign Application Priority Data

Oct. 5, 2006  (JP) .................................. 2006-274307

(51) Int. Cl.
*G06F 11/00*    (2006.01)

(52) U.S. Cl. ........................................................ 714/52
(58) Field of Classification Search .................... 714/52
See application file for complete search history.

(56) References Cited

U.S. PATENT DOCUMENTS

| | | | |
|---|---|---|---|
| 5,765,183 A | 6/1998 | Kojima et al. | |
| 5,875,460 A * | 2/1999 | Kojima et al. | 711/114 |
| 6,014,282 A | 1/2000 | Ito et al. | |
| 6,701,452 B1 | 3/2004 | Kinjo et al. | |
| 2005/0279837 A1 * | 12/2005 | Hajji | 235/492 |
| 2007/0083709 A1 * | 4/2007 | Hajji | 711/114 |
| 2008/0151724 A1 * | 6/2008 | Anderson et al. | 369/53.42 |
| 2011/0010599 A1 * | 1/2011 | Goel et al. | 714/752 |

FOREIGN PATENT DOCUMENTS

| | | |
|---|---|---|
| JP | 08-076941 A | 3/1996 |
| JP | 10-241128 A | 9/1998 |
| JP | 2001-159958 A | 6/2001 |

* cited by examiner

*Primary Examiner* — Amine Riad

(57) ABSTRACT

Embodiments of the present invention help improve the process for updating parities accompanied by the writing process. According to one embodiment, a host controller transmits a write command and new data to a hard disk drive (HDD). The HDD reads old data at a region where the new data are to be written. The HDD then XORs the new data and the old data to generate a pseudo-parity. The HDD sets the pseudo-parity in a data frame addressed to both of a horizontal parity disk drive HDD and a diagonal parity disk drive HDD and transmits it. The horizontal parity disk drive HDD and the diagonal parity disk drive HDD update the parities using the pseudo-parity.

8 Claims, 11 Drawing Sheets

Ph : Horizontal Parity   Pd : Diagonal Parity

Ph : Horizontal Parity          Pd : Diagonal Parity

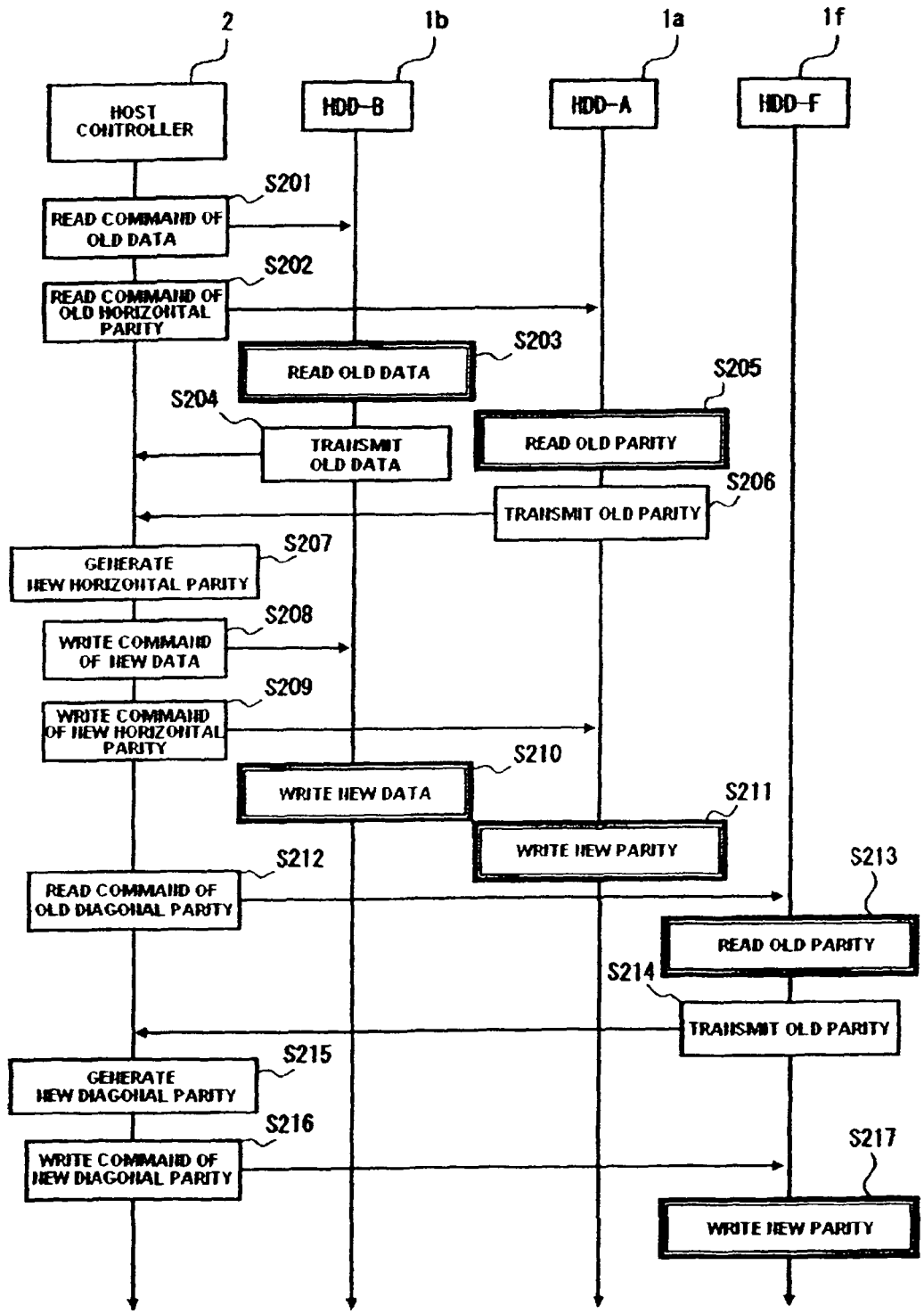

SYSTEM INCLUDING A PLURALITY OF DATA STORAGE DEVICES CONNECTED VIA NETWORK AND DATA STORAGE DEVICE USED THEREFOR

CROSS-REFERENCE TO RELATED APPLICATION

The instant nonprovisional patent application claims priority to Japanese Patent Application No. 2006-274307 filed Oct. 5, 2006 and which is incorporated by reference in its entirety herein for all purposes.

BACKGROUND OF THE INVENTION

Nowadays, a redundant arrays of inexpensive disks (RAID) system has been known as a system in which a plurality of hard disk drives (HDDs) are combined for data to have redundancy, and which aims to improve performance as well as reliability, RAID-5 systems have been widely used among such RAID systems because of the good balance of the reliability and the performance. (For example, refer to the Japanese Patent Publication No. 8-76941 "Patent Document 1").

The RAID-5 system stripes a RAID group consisting of a plurality of HDDs, exclusively ORs (XORs) data on drives of the RAID group by stripe, and records the result as a parity onto a drive of the RAID group. If any logical block address (LBA) of a drive of the RAID group cannot be read out due to an occurring error, the data can be regenerated by XORing the data and the parities in the remaining drives. If the drive goes down, it does not result in data lost but the RAID can recover by writing (rebuilding) the XORed result into a spare stand-by disk.

It has been an advantageous feature that the RAID-5 system can be configured by small computer system interface (SCSI) or fibre channel arbitrated loop (FC-AL) disk devices for OEM instead of special disk devices with high reliability and at high prices because the RAID-5 can recover even if any drive goes down as described above. However, in recent years, entry servers with lower-priced serial ATA (SATA) HDDs have been widely used and error rates in such lower-priced HDDs are one digit higher than in disk devices for enterprises. Therefore, if any disk goes down, and moreover, an unrecoverable read error sector arises on one of the remaining disk drives during the recovery process, the system becomes unrecoverable to go down. To deal with such a problem, a RAID-6 in which the parities are doubled has been adopted in recent years.

The RAID-6 has two parity types, one is P+Q method illustrated in FIG. 8 (refer to Japanese Patent Publication No. 10-241128 "Patent Document 2", for example) and the other is 2D-XOR method illustrated in FIG. 9. As shown in FIG. 8, in the P+Q method, in addition to XORed P-parities used in the RAID-5, Q-parities to which Galois fields of Reed-Solomon codes are added are generated.

For example, one of the P-parities, P-0, is calculated from:

P-0=(0,A) xor (0,B) xor (0,C) xor (0,D), and one of the Q-parities, Q-0, is calculated from:

Q-0=$a(0)*(0,A)$ xor $a(1)*(0,B)$xor $a(2)*(0,C)$ xor $a(3)*(0,D)$.

An error can be corrected by using the P-parities. When two errors occur, they are corrected by solving simultaneous linear equations with two parameters P and Q.

On the contrary, as shown in FIG. 9, in the 2D-XOR method, diagonal XOR parities are generated in addition to conventional horizontal XOR parities of the RAID-5. Specifically, respective values of the horizontal parities Ph's in FIG. 9 are as follows:

Ph-0=(0,B) xor (0,C) xor (0,D) xor (0,E)

Ph-1=(1,A) xor (1,C) xor (1,D) xor (1,E)

Ph-2=(2,0) xor (2,1) xor (2,3) xor (2,4)

Ph-3=(3,A) xor (3,B) xor (3,C) xor (3,D)

Ph-4=(4,A) xor (4,B) xor (4,C) xor (4,D).

Respective values of the diagonal parities Pd's are as follows:

Pd-0=(1,A) xor (2,B) xor (3,C) xor (4,D) xor (0,E)

Pd-1=(2,A) xor (3,B) xor (4,C) xor (0,D) xor (1,E)

Pd-2=(3,A) xor (4,B) xor (0,C) xor (1,D) xor (2,E)

Pd-3=(3,A) xor (4,B) xor (0,C) xor (1,D) xor (2,E)

Pd-4=Ph-0 xor Ph-1 xor Ph-2 xor Ph-3 xor Ph-4.

In the P+Q method, calculation of the Q-parities is complicated. Therefore, for example, if a parity error is erroneously detected due to a bug, etc. or a parity error is detected due to a memory trouble occurs, it is impossible for an engineer to calculate to locate the error position. On the other hand, the 2D-XOR method is simpler in circuit construction so that an engineer can check the conformance of the data by XOR. However, because the two kinds of parities are located on separate drives, the number of times of accessing the drives for updating the parities in data-writing increases from four in the RAID-5 or the P+Q method to six in the 2D-XOR method.

Specifically, the new parity at writing in the RAID-5 can be calculated by XORing the old data, the new data, and the old parity, respectively. When a host controller carries Out these operations, four times of accesses, which are reading the old data from a writing target drive, writing the new data, reading the old parity from a parity disk drive, and writing the new parity, occur.

In the RAID-6, two accesses of reading the old parity from a diagonal parity disk drive and writing a new parity are added to result in six times of accesses in total. A specific example is described while referring to FIGS. 10 and 11. As shown in FIG. 10, the RAID-6 system includes a host controller 2, an HDD-A 1a, an HDD-B 1b, an HDD-C 1c, an HDD-D 1d, an HDD-E 1e, and an HDD-F 1f to configure a disk array, and a, fiber channel arbitrated loop network (FC-AL network) 3 which connects them.

FIG. 10 shows a case that the HDD-B 1b carries out writing at block (0,B) of the RAID group 0 by the 2D-XOR method. FIG. 11 is a sequence diagram illustrating processes by the host controller 2, the HDD-A 1a, the HDD-B 1b, and the HDD-F 1f which participate in the processes in FIG. 10.

First, the host controller 2 transmits a command to the HDD-B 1b to read the old data of the block (0,B) to be written to (S201). Besides, it transmits a command to the HDD-A 1a to read the horizontal parity (Ph-0) to be updated (S202). The HDD-B 1b reads the old data according to the read command at S201 (S203), and transmits the old data to the host controller 2 (S204). The HDD-A 1a reads the old horizontal parity according to the read command at S202 (S205) and transmits the old horizontal parity to the controller 2 (S206).

The host controller 2 generates a new horizontal parity from the new data, the old data, and the old horizontal parity (S207). Then, it transmits the new data and a write command thereof to the HDD-B 1*b* (S208), and transmits the new horizontal parity and a write command thereof to the HDD-A 1*a* (S209). The HDD-B 1*b* and the HDD-A 1*a* write the new data and the new horizontal parity respectively according to the above commands (S210, S211).

Furthermore, the host controller 2 transmits a command to the HDD-F 1*f* to read the diagonal parity (Pd-3) to be updated (S212). The HDD-F 1*f* reads the old diagonal parity according to the read command at S212 (S213), and transmits the old diagonal parity to the host controller 2 (S214). The host controller 2 generates a new parity from the new data, the old data, and the old diagonal parity (S215). Then, it transmits a command to write the new diagonal parity to the HDD-F 1*f* (S216). The HDD-F 1*f* writes the new diagonal parity according to the above commend (S217).

As described above, as the parities increase, overheads by accessing each drive for updating the parities increase. Therefore, to shorten the process time and to improve the performance, it is desirable to reduce the number of accesses for updating the parities accompanied by data-writing. For example, the Patent Document 1 suggests one of the techniques with respect to the RAID-5. In the Patent Document 1, a drive for writing the new data generates data for updating the parity (referred to as a pseudo-parity hereinbelow) by XORing the new data and the old data. A parity disk drive receives the pseudo-parity and generates a new parity by XORing the pseudo-parity and the old parity. This results in reducing the number of times of accessing the drives for updating the parity.

However, the technique disclosed in the Patent Document 1 is intended for the array system using one kind of parity like the RAID-5, but the system using two kinds of parities like the RAID-6 is not considered enough therein. In the Patent Document 1, the drive for writing the new data generates the command and the pseudo-parity, and transmits the command and the pseudo-parity to the parity disk drive which the drive itself or the host controller identifies in the write command. However, to improve the reliability of the system, it is preferable that the processes by the respective drives are simplified. Or, it is preferable that the host controller can instruct the drive for writing the new data without adding new data to the normal write command in order to maintain versatility.

BRIEF SUMMARY OF THE INVENTION

Embodiments in accordance with the present invention are configured to improve the process for updating parities accompanied by the writing process. According to the particular embodiment of the present invention shown in FIG. 2, a host controller 2 transmits a write command and new data to HDD-B 1*b*. The HDD-B 1*b* reads old data at the region (0,B) where the new data are to be written. The HDD-B 1*b* then XORs the new data and the old data to generate a pseudo-parity. The HDD-B 1*b* sets the pseudo-parity in a data frame addressed to both of a horizontal parity disk drive HDD-A 1*a* and a diagonal parity disk drive HDD-F 1*f* and transmits it. The HDD-A 1*a* and the HDD-F 1*f* update the parities using the pseudo-parity.

BRIEF DESCRIPTION OF THE DRAWINGS

FIG. 11 is a flowchart showing the process of the write command in a conventional disk array system.

DETAILED DESCRIPTION OF THE INVENTION

Figure 1:
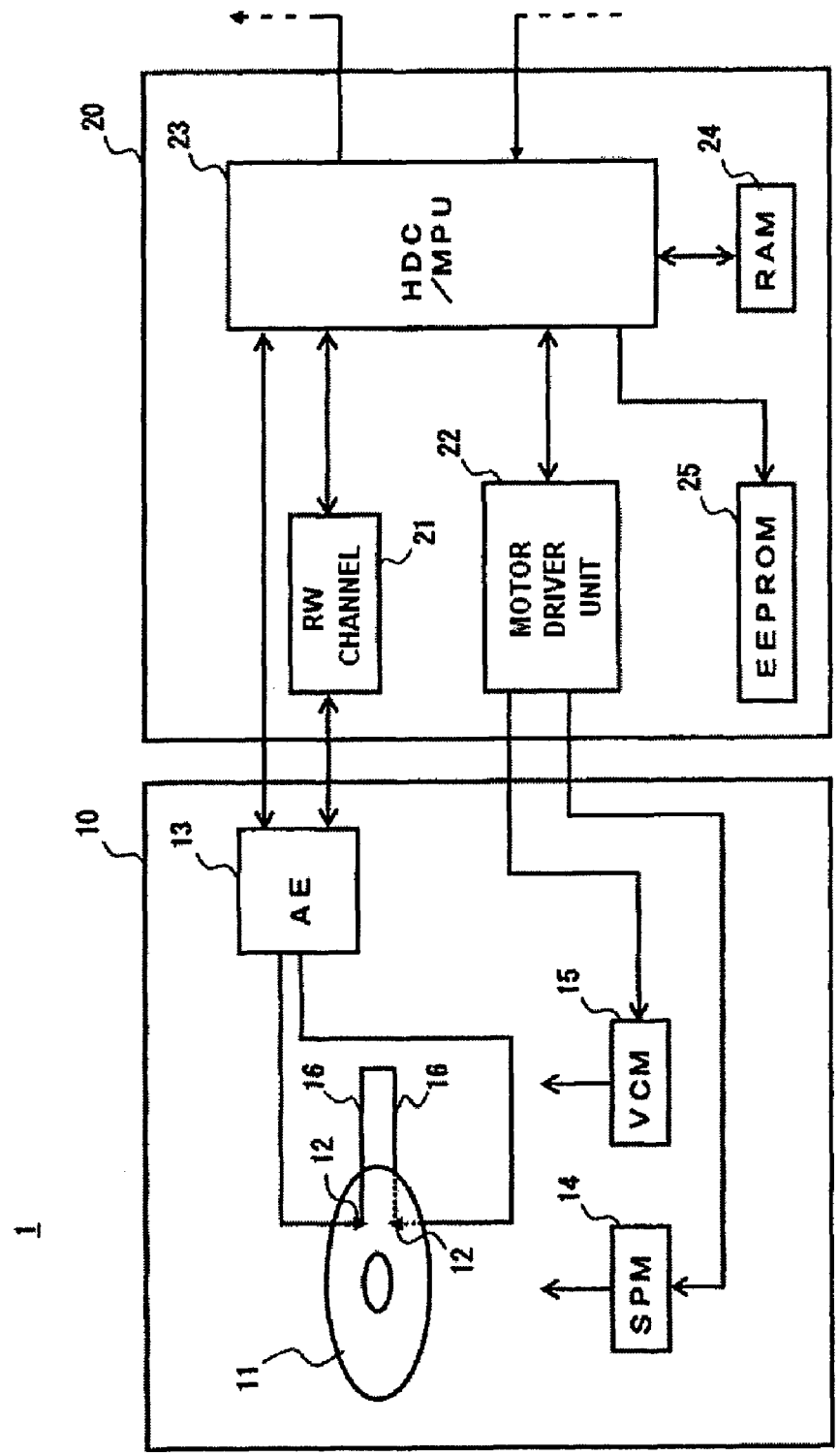
FIG. 1 is a block diagram schematically showing the entire configuration of the HDD according to an embodiment of the present invention.

Embodiments of the present invention relate to a system including a plurality of data storage devices connected via a network and a data storage device used therefor, in particular, to updating parities in the system.

An aspect of embodiments according to the present invention is a system including a first data storage device and a second data storage device connected to the first data storage device via a network. The first data storage device receives a first command for rewriting data of a designated address and a data frame corresponding to the first command. The data frame includes a first data to be used for rewriting data according to the first command, a second command, and a destination of the second command. The first data storage device rewrites the data of the designated address using the first data according to the first command, and transmits the second command and second data to be used for rewriting a parity related with the data of the address to the second data storage device which is the destination of the second command. The second data storage device rewrites the parity related with the data of the address using the second data according to the second command from the first data storage device. The data frame including the second command and the destination thereof in addition to the first data results in restricting the device for generating the command of the second command and improving the reliability and the versatility of the system. The first data may be write data which the first data storage device stores as they are or data to be used in updating the parities.

If the system further includes a third data storage device connected via the network, it is preferable that the data frame further includes a third command and a destination of the third command. The third data storage device obtains the third command and the second data transmitted from the first data storage device and rewrites a parity related with the recorded data of the address using the second data according to the third command. The data frame including the second command and the third command results in restricting the device to generate the command of the second command and improving the reliability and the versatility of the system. The third command may be transmitted as a command from the first data storage device to the third data storage device, or may be included in the data frame and transmitted to another data storage device which transmits the data frame to the third data storage device.

For example, the first data storage device transmits the third command and the second data obtained from the data frame to the third data storage device; and the third data storage device obtains the third command and the second data transmitted from the first data storage device and rewrites the parity.

The first data storage device transmits a data frame including the third command, a destination of the third command and the second data to the second device, the second data storage device transmits the third command and the second data in the received data frame to the third data storage device, and the third data storage device obtains the third command and the second data transmitted from the second data storage device, and rewrites the parity.

The first data storage device generates the second data by XORing the first data to be written at the designated address and old data stored at the address, and the second data storage device generates a new parity by XORing the second data and an old parity stored beforehand. The process for updating the parities can be more efficient by the second data.

Another aspect of embodiments of the present invention is a data storage device to be used in a system including a plurality of data storage devices connected via a network. This data storage device includes a receiver for receiving a first command for rewriting data of a designated address, a first data to be used in rewriting the data corresponding to the first command, and a data frame including a second command and a destination of the second command; a controller for rewriting the data of the designated address using the first data according to the first command; and a transmitter for transmitting the second command and a second data to be used for rewriting a parity related with the data of the address to the destination. The data frame including the second command and the destination thereof in addition to the first data results in restricting the device for generating the command of the second command and improving the reliability and the versatility of the system.

Preferably, the controller generates the second data by XORing the first data to be written at the designated address and old data stored at the address. This makes the parity update process more efficient.

Yet another aspect of embodiments of the present invention is a system including a plurality of data storage devices connected via a network, generating a doubled parities by XORing unit data blocks of the respective data storage devices with respect to two different directions, and storing the parities. This system includes a first data storage device, a second data storage device, and a third data storage device. The first data storage device obtains a write command and new data, rewrites old data with the new data, generates a pseudo-parity by XORing the new data and the old data, and transmits a data frame including the pseudo-parity to two data storage devices which store parities corresponding to the old data. The second data storage device receives the data frame, obtains the pseudo-parity included in the data frame, generates a first new parity by XORing a first old parity corresponding to the old data and the pseudo-party, and stores the first new parity. The third data storage device which receives the data frame, obtains the pseudo-parity included in the data frame, generates a second new parity by XORing a second old parity corresponding to the old data and the pseudo-party, and stores the second new parity. That a data frame including the pseudo-parity is transmitted to the two data storage devices storing the parities corresponding to the old data attains a more efficient process.

Preferably, the first data storage device receives a data frame which includes the new data, a second command, and a destination of the second command. The second data storage device is the destination of the second command, generates and stores the new parity according to the second command transferred from the first data storage device. The data frame including the second command and the destination of the second command results in improving the reliability and the versatility of the system.

Preferably, the data frame received by the first data storage device further includes a third command and a destination of the third command. The third data storage device is the destination of the third command, generates and stores the new parity according to the third command transferred from the first data storage device.

Another aspect of embodiments of the present invention is a data storage device which is used in a system including a plurality of data storage devices connected via a network, generating doubled parities by XORing unit data blocks with respect to two different directions respectively, and storing the parities. This data storage device includes a receiver for receiving a write command and new data, a controller for rewriting old data with the new data and to generate a pseudo-parity by XORing the new data and the old data, and a transmitter for transmitting the data frame including the pseudo-parity to two data storage devices which store parities corresponding to the old data. Transmitting a data frame including the pseudo-parity to the two data storage devices storing the parities corresponding to the old data attains a more efficient process.

The receiver may receive a data frame including the new data, the second command, and a destination of the second command, and the transmitter transmits the second command to the destination and commands to update the parities by using the pseudo-parity. Including the second command and the destination of the second command in the data frame improves the reliability and the versatility of the system.

In the array system including a plurality of data storage devices according to embodiments of the present invention, parity updating process accompanied by data writing can be improved.

Hereinafter, a preferred embodiment to which the present invention is applicable is described. For clearness of explanation, the following description and the accompanying drawings contain omissions and simplifications as appropriate. Throughout the drawings, the same components are denoted by like reference numerals, and their repetitive description is omitted if not necessary for the sake of clearness of the explanation. Hereinbelow, a preferred embodiment of the present invention is described, by way of example of a hard disk drive (HDD) which is an example of data storage devices.

The feature of the present embodiment is a technique for updating parities in an array system including a plurality of data storage devices. Hereinafter, a redundant arrays of inexpensive disks (RAID) system using the HDDs is described as a preferred example of the array systems. First, the configuration of the HDD is outlined. FIG. 1 shows a schematic configuration of an entire HDD 1. As shown in FIG. 1, the HDD 1 includes a magnetic disk 11 which is an example of disks for storing data, head element portions 12, an arm electronics (AE) 13, a spindle motor (SPM) 14, a voice coil motor (VCM) 15, and actuators 16 in an enclosure 10.

The HDD 1 further includes a circuit board 20 fixed outside the enclosure 10. On the circuit board 20, circuits such as a read/write channel (RW channel) 21, a motor driver unit 22, an integrated circuit (HDC/MPU) 23 of a hard disk controller (HDC) and an MPU, a RAM 24, and an EEPROM 25. The SPM 14 rotates the magnetic disk 11 fixed thereto at a predetermined angular rate. The motor driver unit 22 drives the SPM 14 according to control data from the HDC/MPU 23.

The magnetic disk 11 of the present example has recording surfaces for recording data on both surfaces thereof, and the head element portions 12 corresponding to the respective recording surfaces are provided. The respective head element portions 12 are fixed to sliders (not shown). The sliders are fixed to the actuators 16 which are examples of head moving mechanisms. The sliders float over the rotating magnetic disk 11 at the time of reading and writing data. The actuators 16 are coupled to the VCM 15 and pivot around a pivotal axis to move the head element portions 12 in the radial direction of the magnetic disk 11 over the rotating disk.

The motor driver unit 22 drives the VCM 15 according to control data from the HDC/MPU 23. The head element portions 12 typically include write elements which convert an electric signal to a magnetic field according to write data, and read elements which convert a magnetic field from the magnetic disk 11 to an electric signal. At least one piece of the magnetic disk 11 is enough and a recording surface can be formed on either surface or both of the magnetic disk 11.

The AE 13 selects a head element portion 12 for data access from the plurality of head element portions 12, amplifies a reproduction signal reproduced by the selected head element portion 12 with a predetermined gain, and sends it to the RW channel 21. The AE 13 also sends a recording signal from the RW channel 21 to the selected head slider 12. In a writing process, the RW channel 21 modulates codes of the write data supplied from the HDC/MPU 23, converts the code-modulated write data to a write signal, and supplies it to the AE 13. In a reading process, the RW channel 21 extracts data from the obtained read signal, and carries out a decoding process. The data to be read out contain user data and servo data. The decoded read data is supplied to the HDC/MPU 23.

With regard to the HDC/MPU 23, the MPU operates in accordance with micro codes loaded in the RAM 24. Starting up of the HDD 1, data required for controlling and data processing as well as micro codes working on the MPU are loaded from the magnetic disk 11 or a ROM in the HDC/MPU 23. Further, necessary parameters are loaded from the EEPROM 25 to the RAM 24.

The HDC is formed as a logic circuit and carries out various processes integrally with the MPU. For example, the HDC/MPU 23 carries out necessary processes concerning data process, such as order management of command execution, positioning control of the head element portions 12, interface control, defect management. Therefore, the HDC/MPU 23 functions as a controller as well as a transmitter and a receiver of data. The HDC/MPU 23 according to the present embodiment particularly performs interface processes and inner processes in the RAID system in which the HDD 1 participates. The RAM 24 functions as a buffer (cache) which temporarily stores data from the outside and data read from the magnetic disk 11.

Figure 2:
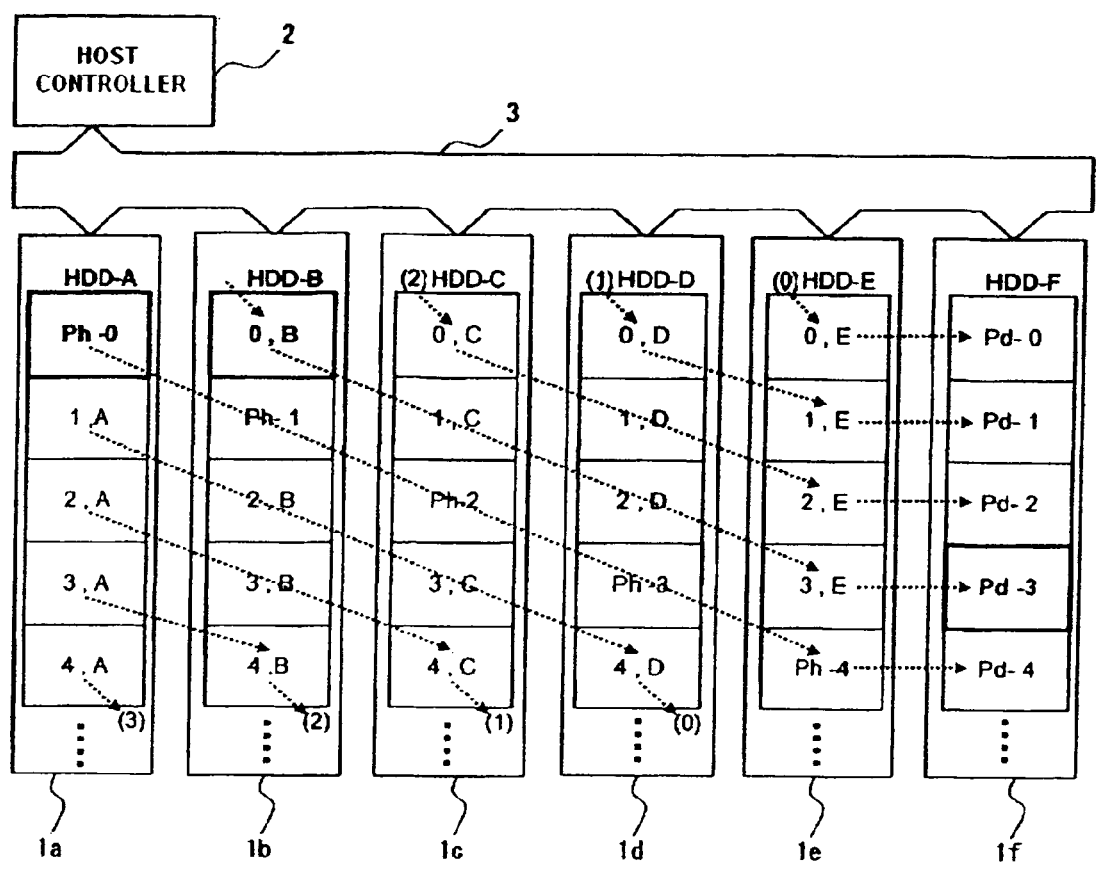
FIG. 2 is a diagram showing the disk array system according to an embodiment of the present invention.

Next, a system utilizing the RAID-6 system is described as an example of the array system of the present invention. As shown in FIG. 2, the array system according to the present embodiment includes a host controller 2, an HDD-A 1a, an HDD-B 1b, an HDD-C 1c, an HDD-D 1d, an HDD-E 1e, and an HDD-F 1f which constitute a RAID group, and a fibre channel arbitrated loop network (FC-AL network) 3 connecting them.

FIG. 2 shows a parity configuration of the RAID-6 system. The RAID-6 system according to the present embodiment has the parity data configuration of the 2D-XOR method. Ph's denote horizontal parities and Pd's denote diagonal parities. The respective HDDs, HDD-A 1a to HDD-E 1e, are striped as schematically shown in FIG. 2 and data storage regions of the HDD-A 1a to the HDD-E 1e are divided into unit blocks respectively.

In FIG. 2, a group of blocks in the line direction constitutes a stripe. The HDD-F 1f is a diagonal parity disk drive which stores the diagonal parities and it does not store user data in this RAID group. The data storage region of the HDD-F 1f is divided into unit blocks as well. Writing and reading data, and calculating parities are carried out by block.

The block of the user data is designated by the stripe number and the ID of the HDD. For example, the block of the stripe 0 in the HDD-B 1b is designated as (0,B). The horizontal parities Ph's are designated by the code of Ph and the stripe number. For example, the horizontal parity Ph of the stripe 0 is Ph-0. The diagonal parities Pd's are also designated by the code of Pd and the corresponding stripe number. For example, the diagonal parity Pd corresponding to the stripe 0 is Pd-0. The horizontal parity is generated by using the data in one stripe but the diagonal parity is generated by using the data from different stripes from each other. The horizontal parities Ph's of the respective stripes are retained by different HDDs from each other.

Specifically, the respective values of the horizontal parities Ph's are as follows:

Ph-0=(0,B) xor (0,C) xor (0,D) xor (0,E)

Ph-1=(1,A) xor (1,C) xor (1,D) xor (1,E)

Ph-2=(2,0) xor (2,1) xor (2,3) xor (2,4)

Ph-3=(3,A) xor (3,B) xor (3,C) xor (3,D)

Ph-4=(4,A) xor (4,B) xor (4,C) xor (4,D).

The respective values of the diagonal parities Pd's are as follows:

Pd-0=(1,A) xor (2,B) xor (3,C) xor (4,D) xor (0,E)

Pd-1=(2,A) xor (3,B) xor (4,C) xor (0,D) xor (1,E)

Pd-2=(3,A) xor (4,B) xor (0,C) xor (1,D) xor (2,E)

Pd-3=(3,A) xor (4,B) xor (0,C) xor (1,D) xor (2,E)

Pd-4=Ph-0 xor Ph-1 xor Ph-2 xor Ph-3 xor Ph-4.

Figure 3:
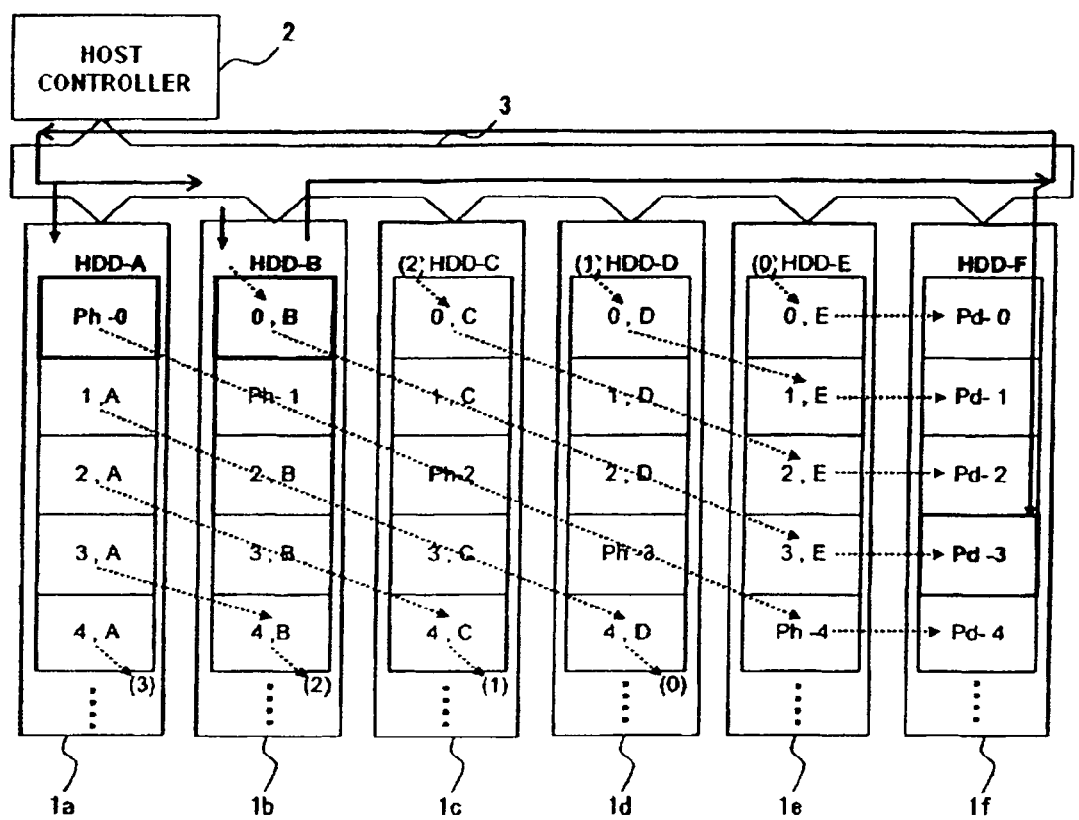
FIG. 3 is a diagram illustrating the process of the write command in the disk array system according to an embodiment of the present invention.
Figure 4:
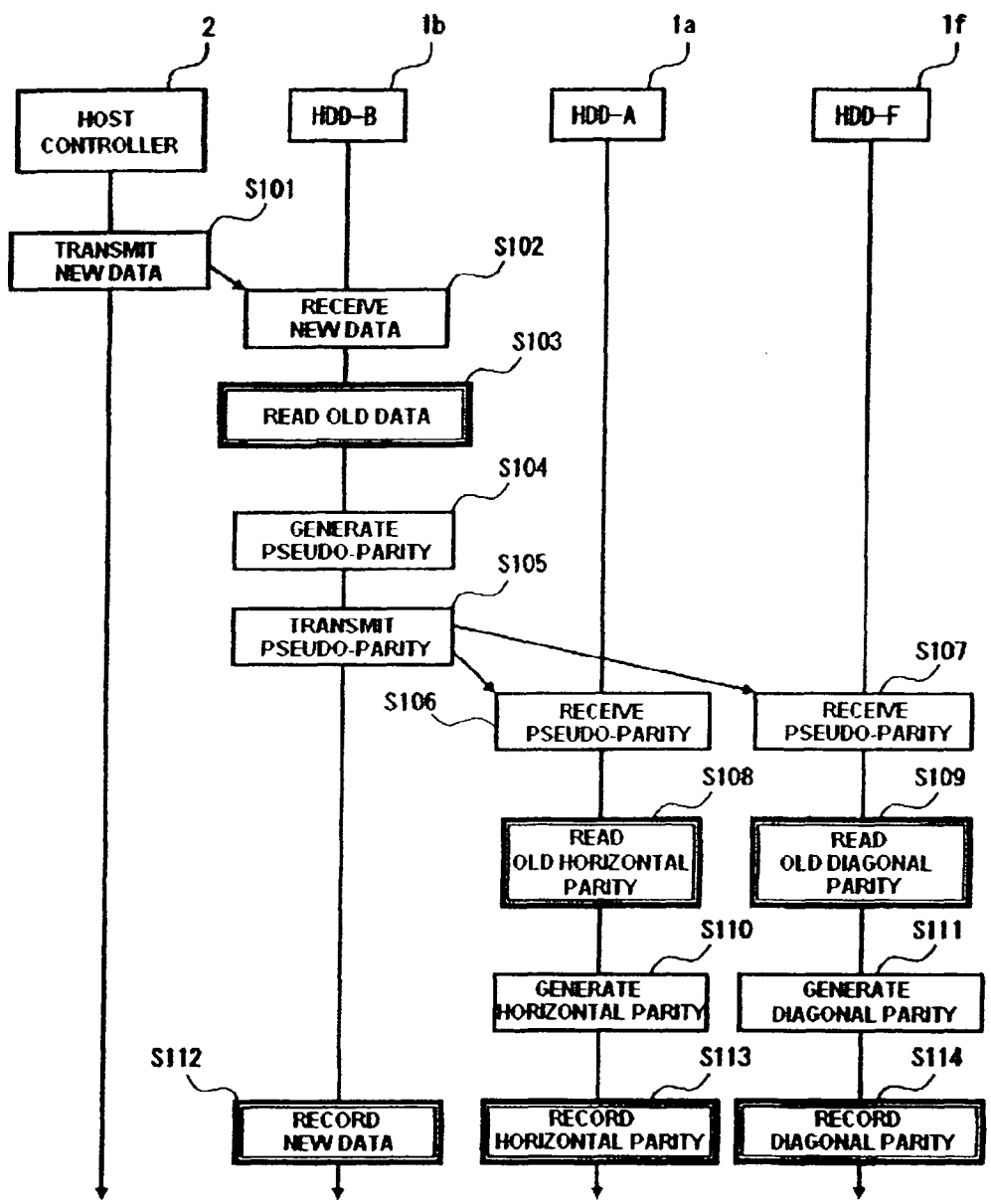
FIG. 4 is a flowchart showing the process of the write command in the disk array system according to an embodiment of the present invention.

Now, referring to FIGS. 3 and 4, an example of data writing and updating parities in the array system of the present embodiment is described. FIG. 3 shows the process for rewriting the data of HDD-B 1b (0,B). FIG. 4 is a sequential diagram of the process shown in FIG. 3 in which the host controller 2, the HDD-A 1a, the HDD-B 1b, and the HDD-F 1f participate.

In FIG. 4, "hd" denotes an access from the host controller 2 to the HDD. "hp" denotes an inner process of the host controller 2. "dp" denotes accesses from the data disk drive (the HDD-B 1b in this example) to the horizontal parity disk drive (the HDD-A 1a in this example) and the diagonal parity disk drive (the HDD-F 1f in this example). "dd" denotes inner processes of the data disk drive HDD-B 1b. "ph" denotes inner processes of the horizontal parity disk drive HDD-A 1*a*. "pd" denotes inner processes of the diagonal parity disk drive HDD-F 1*f*.

As shown in FIGS. 3 and 4, the host controller 2 first transmits a write command and new data for rewriting to the HDD-B 1*b* (S101: hp). The write command includes the LBA for designating the position to be written to and the data length in addition to the ID of the drive (the HDD-B 1*b* in this example). After the HDD-B 1*b* receives the write command and the new data (S102: dp), it reads the old data in the region (0,B) to which the new data is to be written (S103: dp). The HDD-B 1*b* XORs the received new data and the read old data. The XORed result of the new data and the old data is referred to as a pseudo-parity (S104: dp).

Next, the HDD-B 1*b* transmits the pseudo-parity generated at S104 with a command to update the parity to the horizontal parity disk drive HDD-A 1*a* and the diagonal parity disk drive HDD-F 1*f* (S105: dd). The command includes the LBA of the parity to be updated in addition to the drive ID. Then, the HDD-B 1*b* writes the new data to the magnetic disk 11 to rewrite the data (0,B) (S112: dp).

When the horizontal parity disk drive HDD-A 1*a* receives the pseudo-parity (S106: ph), it reads the old horizontal parity Ph-0 to be updated according to the command (S108: ph), and generates a new horizontal parity by XORing the received pseudo-parity and the old horizontal parity (S110:ph). Then, the HDD-A 1*a* writes the new horizontal parity to the magnetic disk 11 of itself to rewrite the data Ph-0 (S113: ph). Thus, it is apparent from the definition of the horizontal parity obtained by the XOR operation that updating the horizontal parity is achieved by using the pseudo-parity.

When the diagonal parity disk drive HDD-F 1*f* receives the pseudo-parity (S107: pd), it reads the old diagonal parity Pd-3 to be updated according to the command (S109: pd) and generates a new diagonal parity by XORing the received pseudo-parity and the old diagonal parity (S111: pd). Then, the HDD-F 1*f* writes a new diagonal parity to the magnetic disk 11 of itself to rewrite the data Pd-3 (S114: pd). Thus, it is apparent from the definition of the diagonal parity obtained by the XOR operation that updating the diagonal parity is achieved by using the pseudo-parity.

As described above, the data disk drive generates the pseudo-parity and transmits it to the each parity disk drive, and the each parity disk drive updates the parities using the pseudo-parity. Thus, the host controller 2 only issues the write command to the data disk at S101 so that a load to the host controller 2 is reduced and the RAID-6 is transparent to the host controller 2 in the access.

The above process causes additional loads to the data disk drive HDD-B 1*b*, the horizontal parity disk drive HDD-A 1*a*, and the diagonal parity disk drive HDD-F 1*f*. However, the inner processes of the data disk drive HDD-B 1*b*, the horizontal parity disk drive HDD-A 1*a*, and the diagonal parity disk drive HDD-F 1*f* can be carried out concurrently as shown in FIG. 4 so that the system performance improves in comparison with that the host controller 2 sequentially carries out the parity calculation.

Besides, the number of times of accessing the respective HDDs is reduced in comparison with the case that the host controller 2 carries out the parity calculation. That is, the number of times of accessing is reduced because it is not necessary that the host controller 2 reads data from the data disk drive HDD-B 1*b*, the horizontal parity disk drive HDD-A 1*a*, or the diagonal parity disk drive HDD-F 1*f*.

Here, it is important that the pseudo-parity is transmitted to the horizontal parity disk drive HDD-A 1*a* and the diagonal parity disk drive HDD-F 1*f* are the same data. Therefore, the data disk drive HDD-B 1*b* can transmit the pseudo-parity to the horizontal parity disk drive HDD-A 1*a* and the diagonal parity disk drive HDD-F 1*f* concurrently.

The data disk drive HDD-B 1*b* generates a frame which contains the horizontal parity disk drive HDD-A 1*a* and the diagonal parity disk drive HDD-F 1*f* as addresses and puts the frame on the network. The parity disk drives HDD-A 1*a* and the HDD-F 1*f* respectively receive the frame and perform their processes.

The array system in the present example uses the FC-AL network 3. For example, the data disk drive HDD-B 1*b* broadcasts the command including the addressees of the two parities to be updated and the data frame including the pseudo-parity on the FC-AL network 3 designating the horizontal parity disk drive HDD-A 1*a* and the diagonal parity disk drive HDD-F 1*f* as the drives for performing processes in an upper layer. It may be preferable to transmit the command to the drives by one broadcasting command like this, but it is possible to transmit the command separately to each drive.

The FC-AL network 3 is a one-way loop network, and in the example shown in FIG. 4, the command and the data frame transmitted from the HDD-B 1*b* reach the HDD-F 1*f* through HDD-C 1*c* to HDD-L 1*e*. The HDD-C 1*c* to HDD-E 1*e* transfer the received command and data frame and destroy them as their inner processes. The HDD-F 1*f* rewrites the parity of which the received command designates the address using the received pseudo-parity. Further, the command and the data frame transferred from the HDD-F 1*f* reach the HDD-A 1*a* via the host controller 2. The HDD-A 1*a* rewrites the parity of which the received command designates the address using the received pseudo-parity.

As described above, in the case that the drives are connected by the FC-AL network 3, if the pseudo-parity goes around the loop after the pseudo-parity is generated at S104, the pseudo-parity is transmitted to the horizontal parity disk drive and the diagonal parity disk drive so that the following processes can be left to the respective drives.

Now, the specific processes at the respective steps are described. At S101, the host controller 2 transmits the addresses of the disk drives and the addresses in the drives of the horizontal parity and the diagonal parity to be updated, in addition to the write command and the new data to be written. That is, in the above case, Ph-0 and Pd-3 are notified as the address of the horizontal parity to be updated and the address of the diagonal parity to be updated, respectively. In the present embodiment, the addresses of the drives in the disk array are notified as arbitrated loop physical addresses (AL_PA) because the each drive is connected via the FC-AL network 3.

The AL_PAs of the disk drives and the addresses where the horizontal and the diagonal parities corresponding to the position (0,B) for writing the new data are stored, are stored in the host controller 2 as parity configuration information. The host controller 2 decides the AL_PAs and the addresses of the horizontal and the diagonal parities based on the drive and the address where the new data is written and the parity configuration information.

At S103, inside of the HDD-B 1*b*, the HDC/MPU 23 reads the old data of (0,B) which is the subject for writing the new data according to the write command received at S102 from the magnetic disk 11 and caches it in the RAM 24. Then, at S104, the HDC/MPU 23 XORs the new data received at S102 and cached in the RAM 24 and the old data cached in the RAM 24 at S103 to generate a pseudo-parity.

Next, at S105, the HDC/MPU 23 transmits the command to update the parities and the pseudo-parity generated at S104 according to the AL_PAs of the disk drives received at S102 on which the horizontal parity and the diagonal parity are to be updated. At this time, the addresses where the parities are to be updated, i.e., (Ph-0) and (Pd-3) are concurrently notified in the horizontal parity disk drive and the diagonal parity disk drive. Then, at S112, the HDC/MPU 23 writes the new data at (0,B) of the magnetic disk 11.

At S108 and S109, inside the horizontal parity disk drive HDD-A 1*a* and the diagonal parity disk drive HDD-F 1*f*, their HDC/MPU's 23 read the old parities of (Ph-0) and (Pd-3) which are the subjects for updating the parities and store them in their RAM 24 according to the parity updating command received at S106 and S107, respectively.

Then, at S110 and S111, the HDC/MPUs 23 of the respective parity disk drives XOR the pseudo-parities received and stored in the RAMs 24 at S106 and S107 and the old parities stored in the RAMs 24 at S108 and S109 to generate the new horizontal parity and the new diagonal parity, respectively. Furthermore, at S113 and S114, the HDC/MPUs 23 write the new parities at (Ph-0) and (Pd-3), respectively.

In the above description, it is explained by way of example that the host controller 2 instructs the drive to which the write command is given of the AL_PAs of the horizontal and diagonal parity disks to which the pseudo-parity is transmitted to and the LBA where the parities are to be updated. However, the respective drives (the HDD-B 1*b* in the above-described embodiment) may have the parity configuration information and determine the addresses to which the horizontal and the diagonal parities are transmitted, based on the write position with respect to the received write command and the parity configuration information.

The above-described embodiment, the data disk drive HDD-B 1*b* for rewriting the data generates commands for updating parities and transmits them to the drives HDD-A 1*a* and the HDD-F 1*f* for rewriting the parities respectively. In the following embodiment, the host controller 2 generates the commands for updating parities and sets them in one data frame together with the write data, and transmits it to the data disk drive HDD-B 1*b*. The data disk drive HDD-B 1*b* unpacks the received data frame to obtain the commands for updating parities, and transmits the commands to the drives HDD-A 1*a* and HDD-F 1*f* together with the pseudo-parities.

Figure 5:
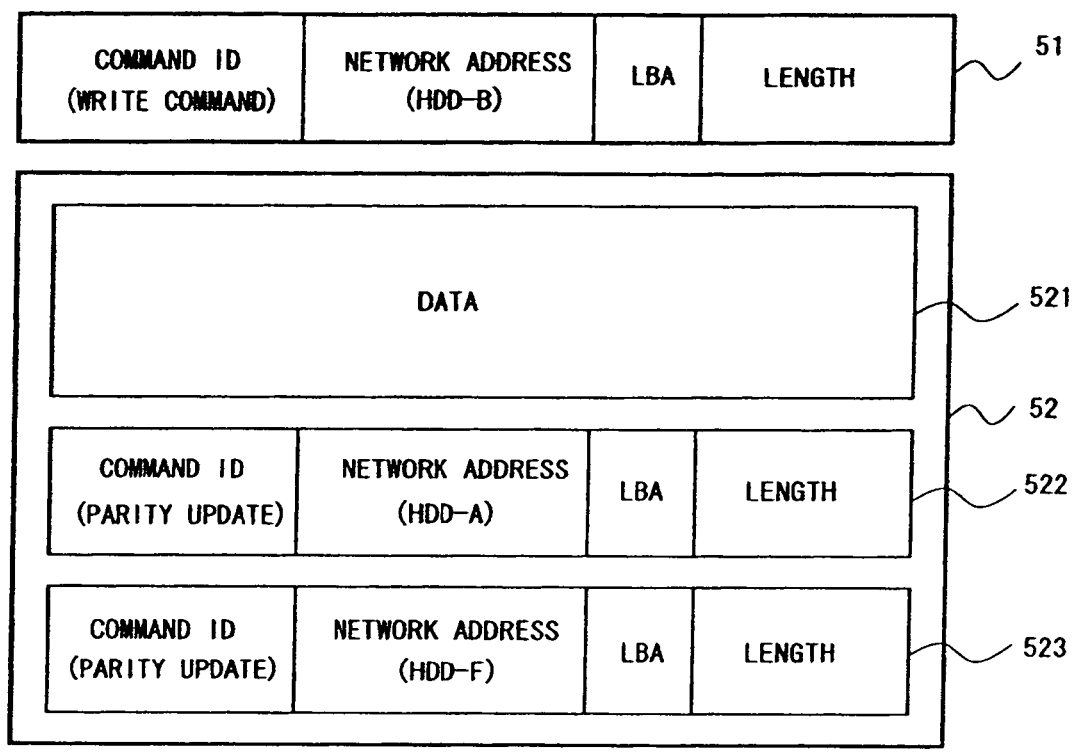
FIG. 5 is a schematic diagram showing the configuration of the write command which the host controller according to an embodiment of the present invention transmits to the data disk drive and the data frame corresponding to the write command.

FIG. 5 schematically illustrates configurations of the write command 51 which the host controller 2 transmits to the data disk drive HDD-B 1*b* for rewriting the user data and the data frame 52 which corresponds to the write command 51. The write command 51 includes a command ID (COMMAND ID) indicating the kind of the command, the address of the command destination (NETWORK ADDRESS), the LBA which designates the region where the write data is to be written, and the data length (LENGTH). In this example, the kind of the command is the write command and the address of the command destination is the address of the data disk drive HDD-B 1*b*.

The data frame 52 contains commands 522 and 523 which order to update the parities in addition to the new data (DATA) 521 which the data disk drive HDD-B 1*b* newly writes. The commands for updating parities 522 and 523 include command ID's (COMMAND ID) indicating the kinds of the commands, the addresses of the command destinations (NETWORK ADDRESS), the LBAs which designate the addresses of the parities to be updated, and the data lengths (LENGTH).

The kinds of the commands 522 and 523 are parity update commands. The network address of the parity update command (NETWORK ADDRESS) 522 is the horizontal parity disk drive HDD-A 1*a* and the network address of the parity update command (NETWORK ADDRESS) 523 is the diagonal parity disk drive HDD-F 1*f*. Since the addresses of the stored horizontal and the diagonal parities are different, the LBA and the data length of the command 522 indicate the address Ph-0 and the LBA and the data length of the command 523 indicate the address Pd-3.

The data disk drive HDD-B 1*b* unpacks the data frame 52 after receiving it from the host controller 2 to obtain the parity update commands 522 and 523. The data disk drive HDD-B 1*b* transmits the parity update command 522 and the pseudo-parity to the horizontal parity disk drive HDD-A 1*a* and the parity update command 523 and the pseudo-parity to the diagonal parity disk drive HDD-F 1*f*.

Figure 6A:
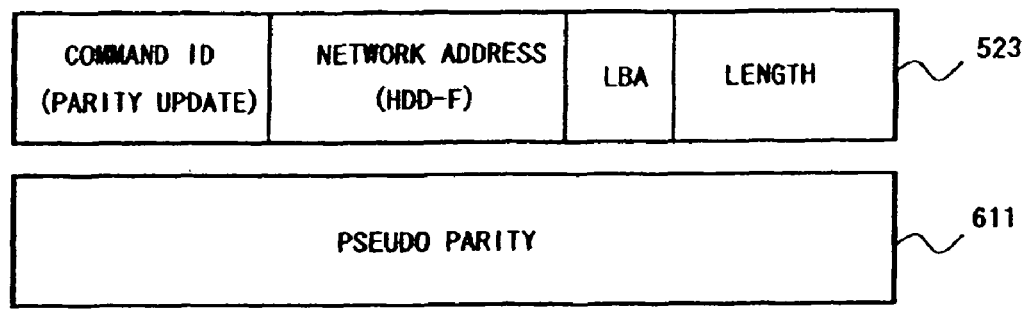
FIGS. 6(*a*)-6(*c*) are diagrams showing the data which the data disk drive according to an embodiment of the present invention transmits to the parity disk drive.
Figure 6B:
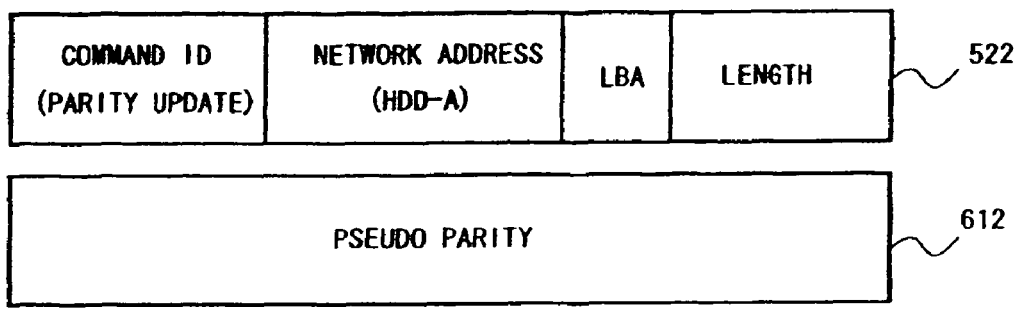
Figure 6C:
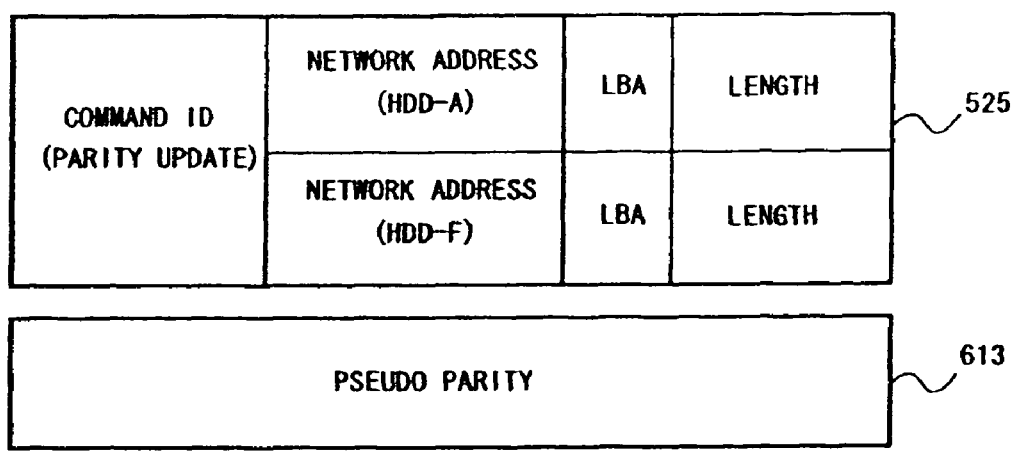

FIG. 6 illustrates data which are transmitted from the data disk drive HDD-B 1*b* to the parity disk drives HDD-A 1*a* and HDD-F 1*f*. FIGS. 6(*a*) and 6(*b*) correspond to FIG. 5 and the data disk drive HDD-B 1*b* transmits the parity update commands 522 and 523 and pseudo parities (PSEUDO PARITY) 611 and 612 to the HDD-A 1*a* and the HDD-F 1*f*, respectively. As described above, the pseudo-parities 611 and 612 are identical data.

When the horizontal parity disk drive HDD-A 1*a* obtains the parity update command 522 and the pseudo-parity 611 from the data disk drive HDD-B 1*b*, it rewrites the horizontal parity Ph-0 based on them. When the diagonal parity disk drive HDD-F 1*f* obtains the parity update command 523 and the pseudo-parity 612 from the data disk drive HDD-B 1*b*, it rewrites the horizontal parity Pd-3 based on them.

As shown in FIG. 6(*c*), the data disk drive HDD-B 1*b* may transmit the parity update command 525 including both of the HDD-A 1*a* and the HDD-F 1*f* as the destinations to the HDD-A 1*a* and the HDD-F 1*f* concurrently. In this case, each transmission of the parity update command and the corresponding pseudo-parity 613 by the data disk drive HDD-B 1*b* is once.

Figure 7A:
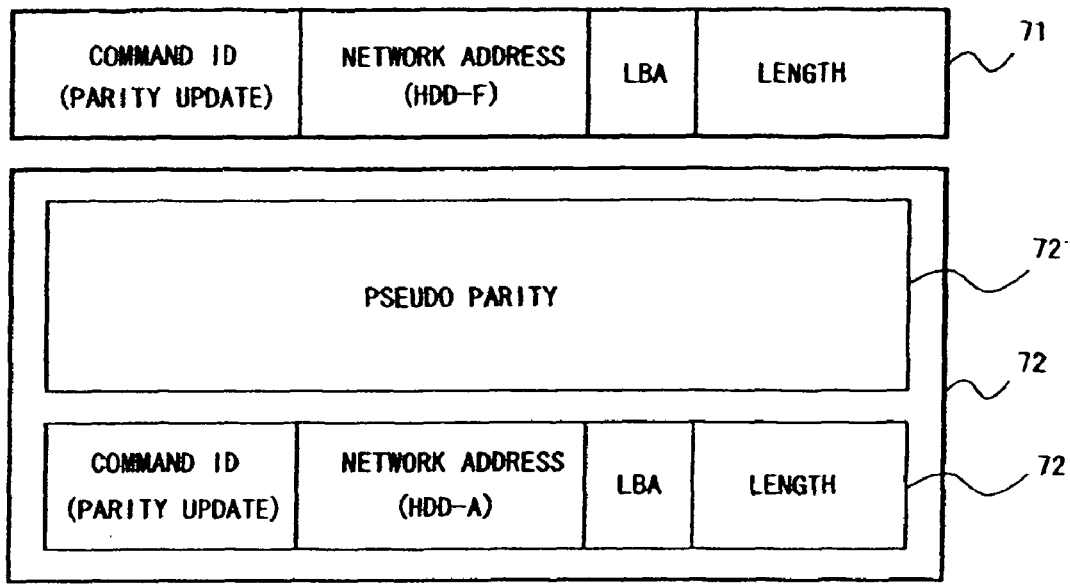
FIGS. 7(*a*) and 7(*b*) show examples where the data frame transmitted by the data disk drive according to an embodiment of the present invention includes the parity update command.
Figure 7B:
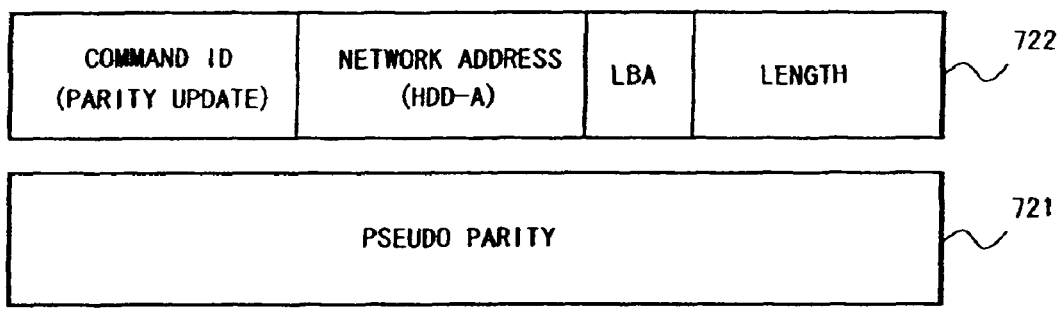
Figure 8:
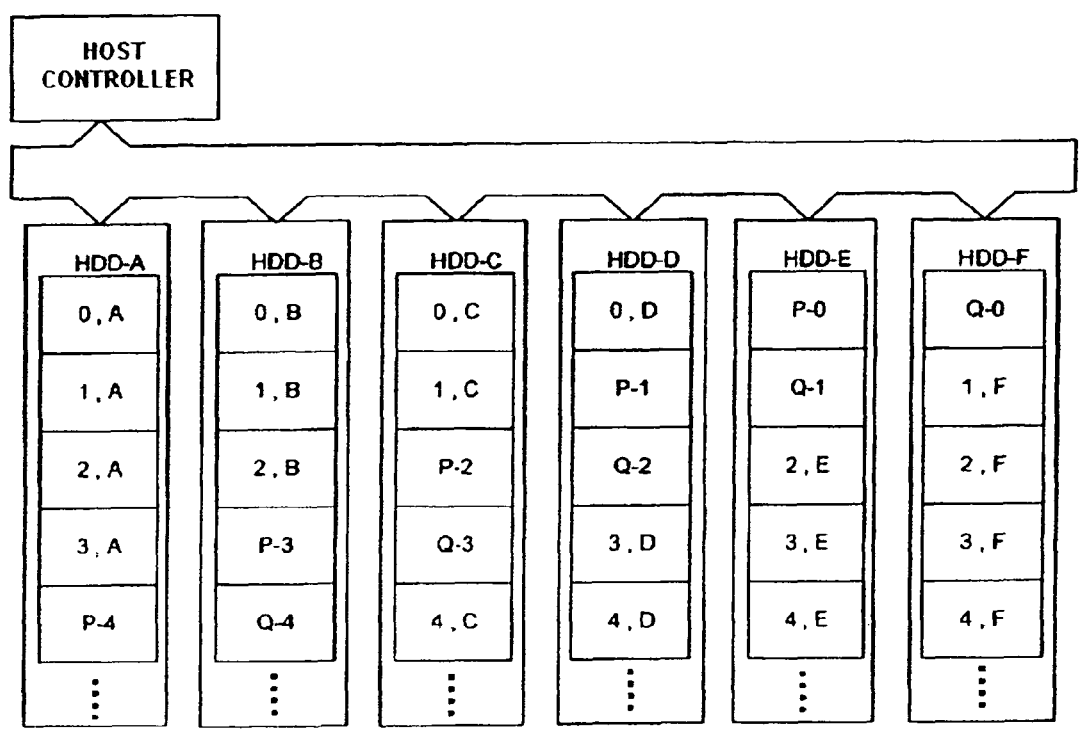
FIG. 8 is a diagram showing a conventional disk array system of P+Q method.
Figure 9:
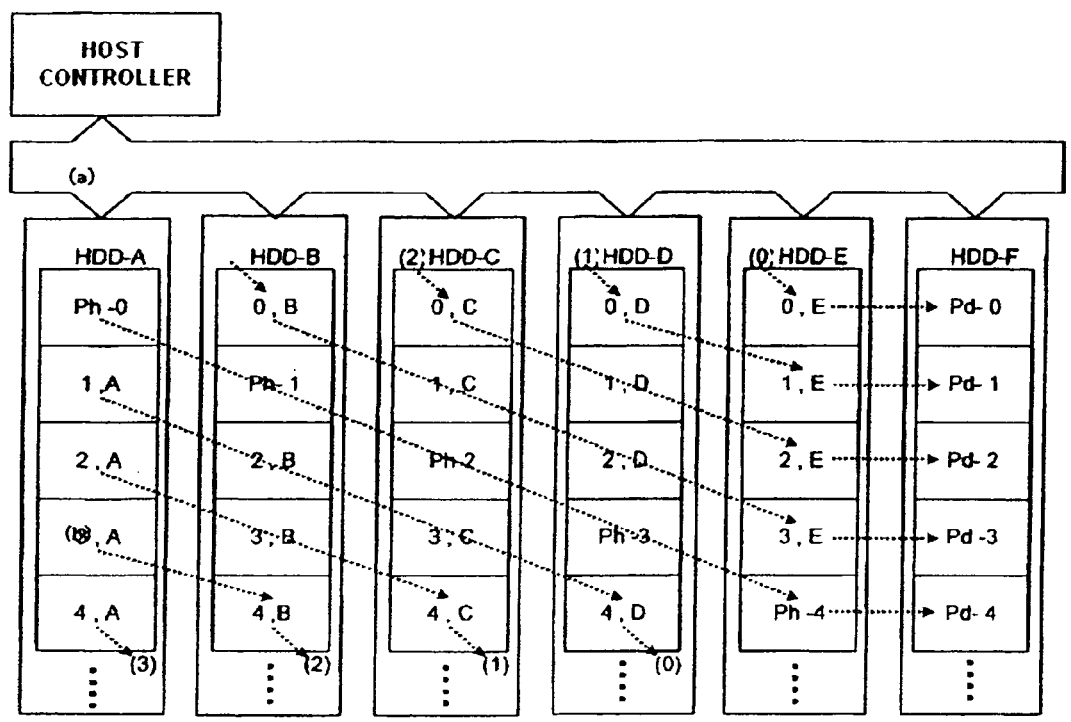
FIG. 9 is a diagram showing a conventional disk array system with diagonal parity system.
Figure 10:
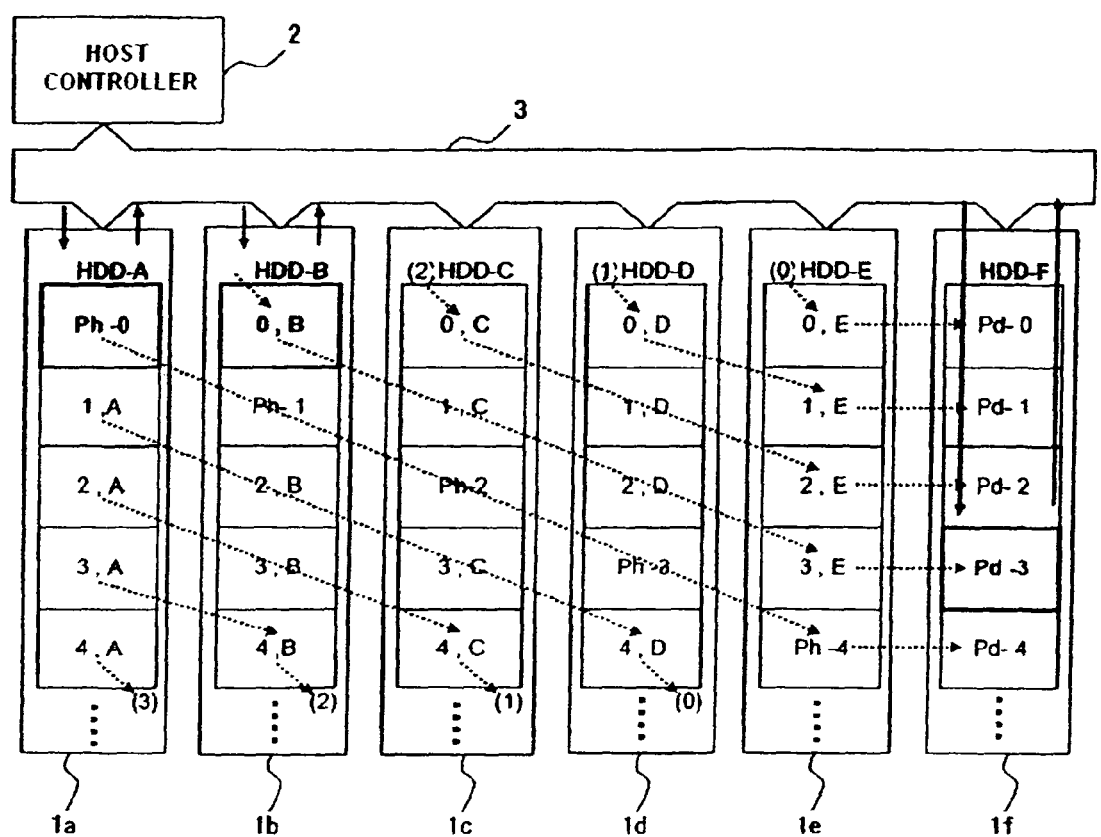
FIG. 10 is a diagram showing the process of the write command in a conventional disk array system.

In the above example, the data disk drive HDD-B 1*b* transmits the commands to both of the parity disk drives HDD-A 1*a* and HDD-F 1*f*, but the data frame transmitted by the data disk drive HDD-B 1*b* may include the parity update command. FIG. 7(*a*) illustrates the data (this term includes the command) which the data disk drive HDD-B 1*b* transmits to the diagonal parity disk drive HDD-F 1*f*. The diagonal parity disk drive HDD-F 1*f* is located at an upper stream position than the horizontal parity disk drive HDD-A 1*a* with respect to the data disk drive HDD-B 1*b* as a starting point.

As shown in FIG. 7(*a*), the data disk drive HDD-B 1*b* transmits the parity update command 71 addressed to the HDD-F 1*f* and the corresponding data frame 72. The data frame 72 includes the parity update command 722 addressed to the HDD-A 1*a* in addition to the pseudo-parity 721. The diagonal parity disk drive HDD-F 1*f* unpacks the data frame 72 to obtain the parity update command 722 and transfers the parity update command 722 and the pseudo-parity 721 to the horizontal parity disk drive HDD-A 1*a* as shown in FIG. 7(*b*). The parity disk drives HDD-F 1*f* and HDD-A 1*a* respectively update the parities using the pseudo-parity 721.

As described above, the data frame includes the parity update command, which results in the restriction of the devices for generating commands to specific drives and the improvement of the versatility and the reliability of the system. The method for the data frame to include the parity update command is particularly effective to a system having multiple kinds of parities like RAID-6, but may be applied to a system having a single kind of parity like RAID-5. The command is preferably generated by the host controller 2 but it can be considered that the data disk drive HDD-B 1*b* generates the two commands in accordance with the designs. The method in which the data frame includes the parity update command may be used with the pseudo-parity but they may be used separately.

As set forth above, the present invention is described by way of certain embodiments but is not limited to the above embodiments. A person skilled in the art can easily modify, add, and convert the each element in the above embodiments within the scope of the present invention. For example, the present invention can be applied to the system using other network than a loop network like FC-AL. In the above description, a disk array system of the RAID-6 system having doubled parity information is described by way of example but a disk array system having more than two multiplexed parities can be applied to. It is preferable that the data amount to be transmitted is reduced by transmission of the pseudo-parity. However, a method for directly transmitting the source data for generating the pseudo-parity, i.e., a set of new data and the old data concerning the write command can be considered. The present invention can be also applied to other parity methods.

What is claimed is:

1. A first data storage device to be used in a system including a plurality of data storage devices connected via a network, the first data storage device comprising:
   a receiver for receiving a first command for rewriting data of a designated address, first data to be used in rewriting the data corresponding to the first command, and a data frame including a second command, a first destination of the second command, a third command, and a second destination of the third command;
   a controller for rewriting the data of the designated address using the first data according to the first command; and
   a transmitter for broadcasting the data frame including the second command, the third command, and a second data to be used for rewriting first and second parities related with the data of the designated address, wherein the data frame also includes a first logical block address of a second storage device and a second logical block address of a third storage device, wherein the second storage device stores the first parity related to a first parity direction of the system, and the third storage device stores the second parity related to a second parity direction of the system.

2. The data storage device according to claim 1, wherein the controller generates the second data by XORing the first data to be written at the designated address and old data stored at the address.

3. A system including a plurality of data storage devices connected via a network, the plurality of data storage devices generate a doubled parities by XORing unit data blocks of the respective data storage devices with respect to two different directions, and store the parities, the system comprising:
   a first data storage device which obtains a write command and new data, rewrites old data with the new data, generates a pseudo-parity by XORing the new data and the old data, and transmits a data frame including the pseudo-parity to a second data storage device that stores a first old parity corresponding to the old data with respect to a first direction, and to a third storage device that stores a second old parity corresponding to the old data with respect to a second direction;
   the second data storage device which receives the data frame, obtains the pseudo-parity included in the data frame, generates a first new parity by XORing the first old parity corresponding to the old data with respect to the first direction and the pseudo-party, and stores the first new parity with respect to the first direction; and
   the third data storage device which receives the data frame, obtains the pseudo-parity included in the data frame, generates a second new parity by XORing the second old parity corresponding to the old data with respect to the second direction and the pseudo-party, and stores the second new parity with respect to the second direction.

4. The system according to claim 3, wherein the first data storage device receives a data frame which includes the new data, a second command, and a destination of the second command; and the second data storage device is the destination of the second command, generates and stores the new parity according to the second command transferred from the first data storage device.

5. The system according to claim 4, wherein the data frame received by the first data storage device further includes a third command and a destination of the third command; and
   the third data storage device is the destination of the third command, generates and stores the new parity according to the third command transferred from the first data storage device.

6. The data storage device according to claim 3, wherein the first direction is a horizontal parity direction, and the second direction is a diagonal parity direction.

7. A first data storage device, which is used in a system including a plurality of data storage devices connected via a network, the plurality of data storage devices generate doubled parities by XORing unit data blocks with respect to two different directions, and store the parities, the first data storage device comprising:
   a receiver for receiving a write command and new data;
   a controller for rewriting old data with the new data and to generate a pseudo-parity by XORing the new data and the old data; and
   a transmitter for broadcasting a data frame over the network to the plurality of data storage devices, wherein the data frame includes a first logical block address of a second data storage device, a second logical block address of a third data storage device, and the pseudo-parity.

8. The data storage device according to claim 7, wherein the receiver receives a data frame including the new data, the second command, and a destination of the second command; and the transmitter transmits the second command to the destination to update the parities by using the pseudo-parity.

* * * * *